L. WERTHEIM.

BAG LOCK.

APPLICATION FILED JAN. 14, 1915.

Reissued Feb. 23, 1915. 13,886.

Witnesses:
Julius H. Katz
Patrick A. Bolger

Inventor
Ludwig Wertheim
By his Attorney
Isaac B. Owens

UNITED STATES PATENT OFFICE.

LUDWIG WERTHEIM, OF NEW YORK, N. Y.

BAG-LOCK.

13,886. Specification of Reissued Letters Patent. Reissued Feb. 23, 1915.

Original No. 1,074,074, dated September 23, 1913, Serial No. 755,640. Application for reissue filed January 14, 1915. Serial No. 2,267.

*To all whom it may concern:*

Be it known that I, LUDWIG WERTHEIM, a citizen of the United States, and a resident of the borough of Manhattan, city, county, and State of New York, have invented certain new and useful Improvements in Bag-Locks, of which the following is a description in such full, clear, and exact terms as will enable any person skilled in the art to which it pertains to make and use the same.

My invention relates to improvements in locks for ladies' hand bags of that class in which the usual spring knobs are provided with an additional lock to prevent accidental disengagement.

The invention consists in certain novel features of construction and combinations of parts which will be fully set forth hereinafter and specified in the claims.

Reference is had to the accompanying drawings in which—

Figure 1:
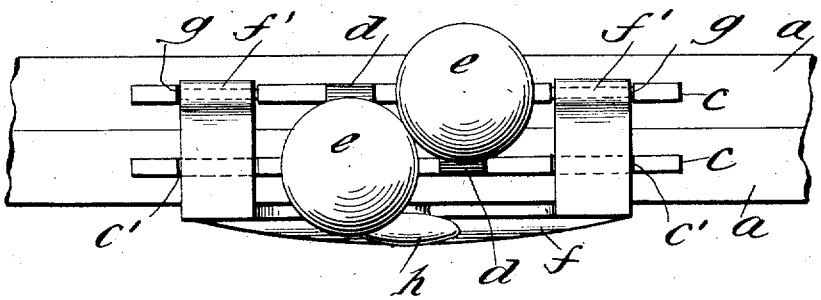
Figure 2:
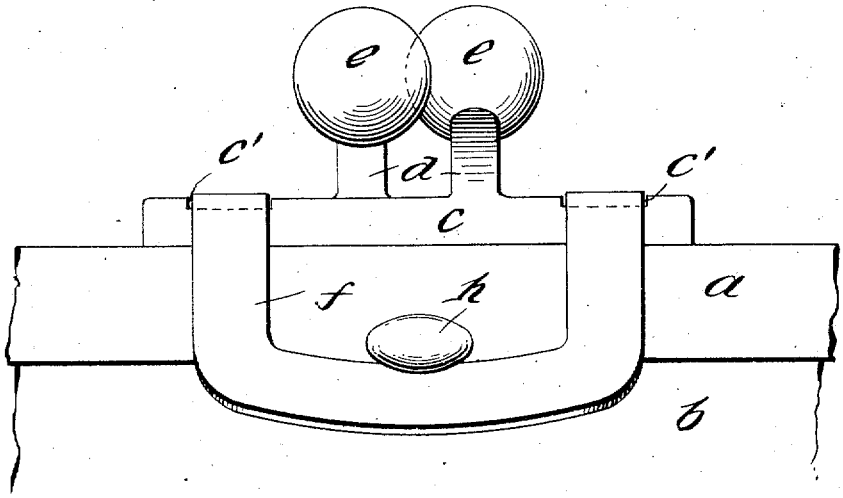

Figure 1 is a plan view of the invention and Fig. 2 is a side elevation of the same.

The frames *a* of the bag carry the body *b* in the usual manner and have fastened to or formed on their upper edges at or near their middle ribs *c*. From these ribs *c* stems *d* project carrying the locking knobs or balls *e* which are designed to engage each other in the usual manner, thereby holding the frames closed.

*f* indicates a yoke stamped and bent of sheet metal or otherwise formed. The two arms of this yoke are formed with eyes *f'* which are loosely mounted on pins *g* held in the edges of one of the ribs *c*. The other rib *c* is formed with notches *c'* to allow the arms of the yoke to set snugly on the rib, straddling the knobs *e* as shown.

The yoke *f* bends down alongside of the frame *a* opposite the rib *c* which bears the pins *g* and lies snugly against the side of the frame.

*h* indicates a button which is fastened to the frame at the side of which the yoke bears so that the bend of the yoke may spring over the button and lock therewith as shown. This button *h* is elongated or oval shaped and its elongated or oval shaped side is exposed to the friction of the yoke so that it will not wear excessively.

It will be seen that by this device a most secure lock is obtained. The fact of the yoke bending over the side of the frame and locking there with the button *h* makes accidental disengagement of the parts a practical impossibility and then when the yoke is manually thrown back, the frames are yet held by the knobs *e*. Two distinct manual movements are therefore necessary in order to open the bag. These movements cannot possibly occur by accident nor by a violent snatching at the bag or other attempt to open it by violence.

Having thus described my invention, what I claim as new and desire to secure by Letters Patent of the United States is:—

1. The combination with a bag and its frames, of the locking knobs on the frame, a yoke hinged to one frame and adapted to embrace the locking knobs, the yoke bending down the side of the other frame and a knob on the side of said other frame to engage and lock the yoke, and ribs on the frames, one rib carrying the hinge pins of the yoke and the other recessed to receive the arms of the yoke.

2. The combination with a bag and its frames, of the locking device on the frame, a yoke hinged to one frame and having a bend therein whereby it may embrace the locking device and bend down on the side of the opposite frame and a knob on the side of said opposite frame wherewith the yoke is adapted to removably engage for the purpose specified.

In witness whereof I have hereunto signed my name in the presence of two witnesses.

LUDWIG WERTHEIM.

Witnesses:

STO S. RAUST,

E. HIRSCHFELD.